Jan. 25, 1966 C. H. WILLSEY 3,231,118
FEEDING AND DELIVERY APPARATUS FOR EGG WASHING MACHINES
Filed May 7, 1962 6 Sheets-Sheet 1

Fig. 1.

Inventor
CHARLES H. WILLSEY
by Cromwell, Greist & Warden
Attys.

Jan. 25, 1966     C. H. WILLSEY     3,231,118
FEEDING AND DELIVERY APPARATUS FOR EGG WASHING MACHINES
Filed May 7, 1962     6 Sheets-Sheet 5

Fig. 6.

Inventor
CHARLES H. WILLSEY

By Cromwell, Greist & Warden
Attys.

Jan. 25, 1966  C. H. WILLSEY  3,231,118
FEEDING AND DELIVERY APPARATUS FOR EGG WASHING MACHINES
Filed May 7, 1962  6 Sheets-Sheet 6

Fig. 7.

Inventor
CHARLES H. WILLSEY
by Cromwell, Greist & Warden
Attys.

United States Patent Office 3,231,118
Patented Jan. 25, 1966

3,231,118
FEEDING AND DELIVERY APPARATUS FOR EGG WASHING MACHINES
Charles H. Willsey, Topeka, Kans., assignor to Norris Grain Company, Chicago, Ill., a corporation of Illinois
Filed May 7, 1962, Ser. No. 192,807
5 Claims. (Cl. 214—301)

This invention relates to egg handling machinery and is more particularly concerned with improvements in an egg transfer and conveyor apparatus especially adapted for use with a machine for washing or otherwise treating shell eggs preliminary to breaking and separating, or grading and/or packaging operations.

In the handling of shell eggs preparatory to cracking and separating or grading and/or packaging for retail sale, it is the usual practice to first remove the accumulation of dirt which is commonly found on egg shell surfaces and also any accompanying bacteria or germs which may be present by subjecting the eggs to a washing and sterilizing operation. Machines for automatically performing this operation have been developed wherein the eggs are carried on a continuously traveling, horizontal conveyor beneath vertically reciprocating brushes which are supplied with a cleaning fluid and wherein the conveyor comprises spaced rollers extending between side chains having pocket forming grooves so that a plurality of eggs, for example, six in number, are carried in the pockets between successive rollers and the rollers are rotated so that the eggs are revolved continuously about their long axes while they are advanced beneath the cleaning brushes. One such machine is disclosed in my Patent No. 2,979,746 dated April 18, 1961. In operating egg washing machines of this type the eggs have been supplied generally from conventional thirty dozen packing and shipping crates, which are almost universally used in the bulk shipment and storage of shell eggs. The operator employs a lifter which is manipulated to pick up a layer of five rows of six eggs each from the packing or separator trays in the crate and to deposite the eggs on the receiving end of the washing machine conveyor. At the completion of the washing operation the cleaned eggs are delivered to a cracking machine, or discharged onto the traveling belt of a grading machine or other conveying apparatus for advance to the next processing operation or for manual return to the bulk packing case for storage or shipment. These manual feeding and delivery arrangements have not been satisfactory for many obvious reasons and it is a general object of the present invention to provide an improved infeed and outfeed apparatus which automatically transfers successive rows of eggs from loaded separator trays to the washing machine conveyor at the infeed end of the washing machine and at the outfeed end thereof transfers the clean eggs to empty pockets in another separator tray so that the only task required of the operator is the removal of the loaded separator trays from the packing case and the return of the same when filled with clean eggs.

It is a more specific object of the invention to provide apparatus for automatically transferring eggs in row formation from a loaded or partially loaded separator tray carried on a side conveyor to the infeed end of an egg washing machine conveyor and at the end of the washing cycle for transferring the cleaned eggs in row row formation from the washing machine conveyor to an empty row of pockets in a separator tray which may also be carried on the side conveyor.

It is a still more specific object of the invention to provide an apparatus for automatically feeding eggs from a loaded packing or separator tray to the receiving end of an egg washing machine conveyor and for automatically removing the cleaned eggs at the discharge end of the washing machine conveyor and depositing them in an empty separator tray which apparatus comprises a tray supporting conveyor arranged in parallel relation along a side of the washing machine conveyor with a tray stacking mechanism for receiving empty trays at the leading end thereof, a swinging transfer frame which is operative at the infeed end of the washing machine conveyor to intermittently pick up a row of eggs from a loaded tray on the parallel conveyor and deposit the same on the washing machine conveyor, a like transfer frame at the outfeed end of the washing machine conveyor which is operative intermittently to pick up each successive row of cleaned eggs from the washing machine conveyor and deposit the same in a row of empty pockets in a separator tray on the parallel conveyor, and mechanism for intermittently advancing the conveyors and for swinging the transfer frames in timed relation to the movement of the conveyors whereby all that is required to keep the washing machine operating with a continuous supply of eggs is the placing of separator trays filled with eggs adjacent one end of the parallel conveyor, the placing of empty separator trays adjacent the other end of the same conveyor and the removal of the trays when they are filled with clean eggs by operation of the transfer frame at the outfeed end of the washing machine.

Another object of the invention is to provide in apparatus of the type described a tray stacking device at the leading end of the tray supporting conveyor which is operative automatically to receive the separator trays after the eggs are removed therefrom and to arrange successive trays in a stack.

Still another object of the invention is to provide in an egg handling apparatus of the type described an egg orienting or arranging device which receives successive rows of eggs from a revolving roller type conveyor, where they are arranged with their long axes extending generally horizontal, and elevates the eggs while automatically arranging the eggs with their axes generally vertically and with their larger ends uppermost so as to facilitate removal of the rows of eggs from the conveyor by an associated transfer mechanism which includes an oscillating frame having pairs of cooperating egg gripper members and power drive means for swinging the frame into an out of an egg pick up position where the gripper members are closed on a row of eggs on the orienting device.

These and other objects and advantages of the invention will be apparent from a consideration of the apparatus which is shown by way of illustration in the accompanying wherein:

FIGURE 2 is a side elevation of the egg handling apparatus with portions thereof broken away;

Figure 5:
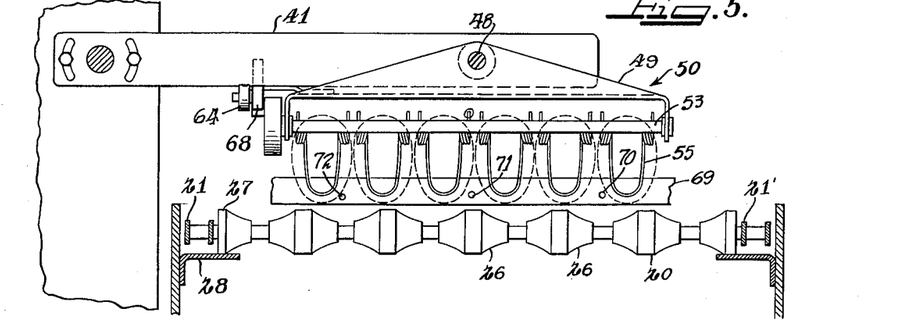
FIGURE 5 is a fragmentary section taken on the line 5—5 of FIGURE 1, to an enlarged scale, and with the transfer device in position to discharge a row of eggs onto the washing conveyor.
Figure 7:
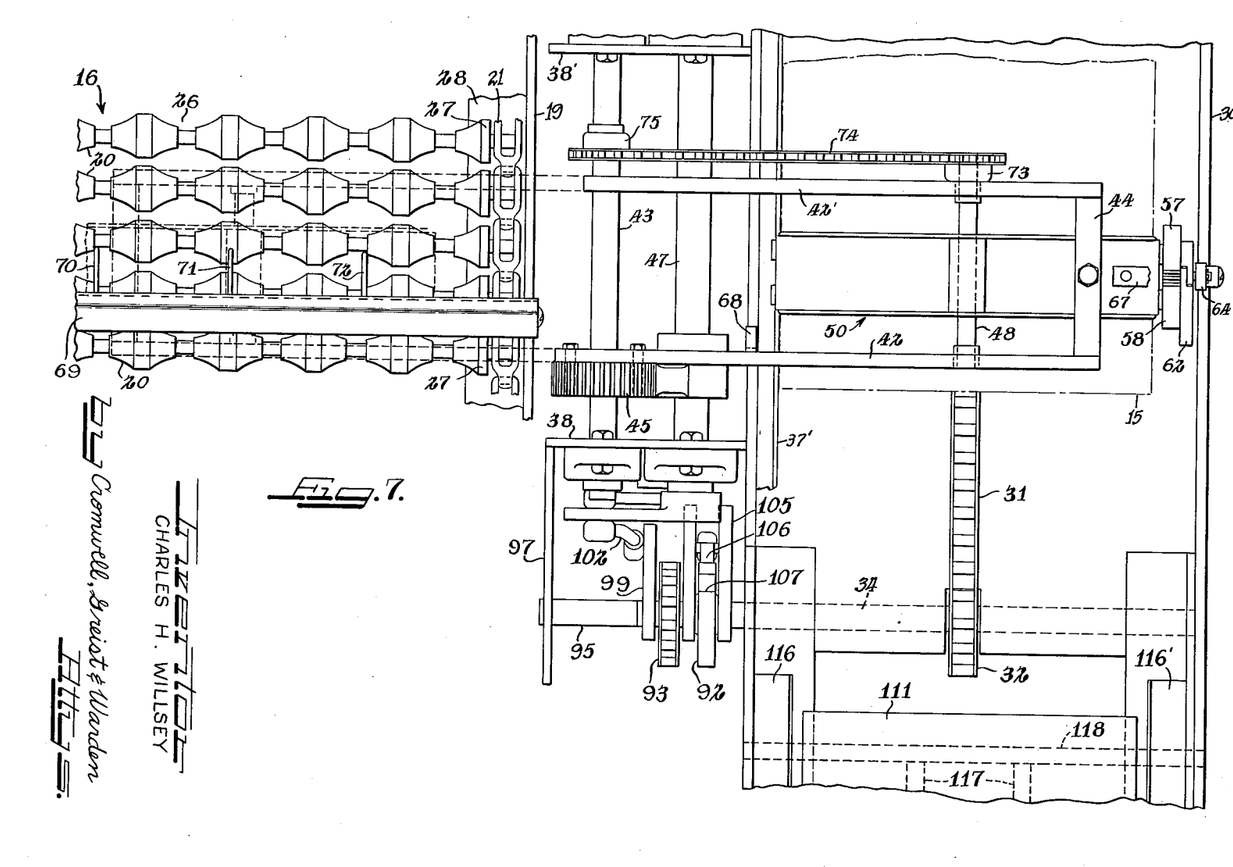
FIGURE 7 is a fragmentary plan view at the infeed end of the washing machine, to an enlarged scale.
Figure 8:
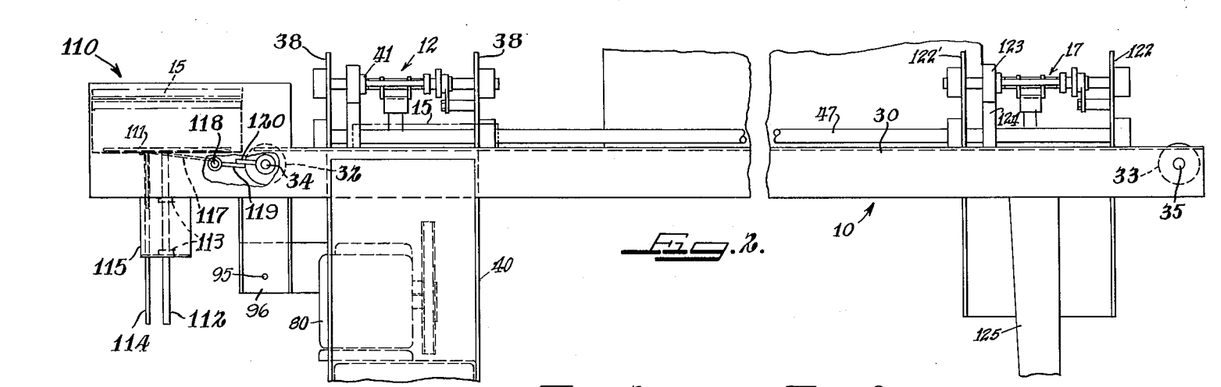

the tray 15 which is advanced by the chain 31 on the conveyor 10 along the guide bar 37' to a position above the conveyor assembly 16 for deposit in pockets between a pair of roller assemblies 20. A cam bar 68 is mounted on the frame 41 for tripping the arm 62 to open the gripper members 55 and 56 so as to release the eggs for deposit in the conveyor pockets. A cross bar member 69 (FIGURES 1, 5 and 7) is mounted on the frame 19 at the infeed end of the washing machine above the conveyor 16 and in the path of the eggs carried by the gripper members 55 and 56. The cross bar 69 has mounted thereon horizontally extending pins 70, 71 and 72 which are spaced transversely of the conveyor 16 so as to guide the eggs into the pockets in predetermined arrangement, that is, three of the eggs in the row are tilted on the one side of the center of the conveyor so that they settle into the pockets with their larger ends pointing in the direction towards the side of the conveyor while the three eggs on the other side of the center of the conveyor are guided into the conveyor pockets with the larger ends pointing in the opposite direction. The gripper assembly 50 is maintained in horizontal position during the movement of the frame 41 by connecting the sprocket 73 mounted on the end of the cross shaft 48 through chain 74 with sprocket 75 which is rotatably supported on the shaft 43 and held in fixed position by connecting the arm 76 extending from the sprocket 75 to support plate 38' with a bracket or bolt member 77.

Figure 6:
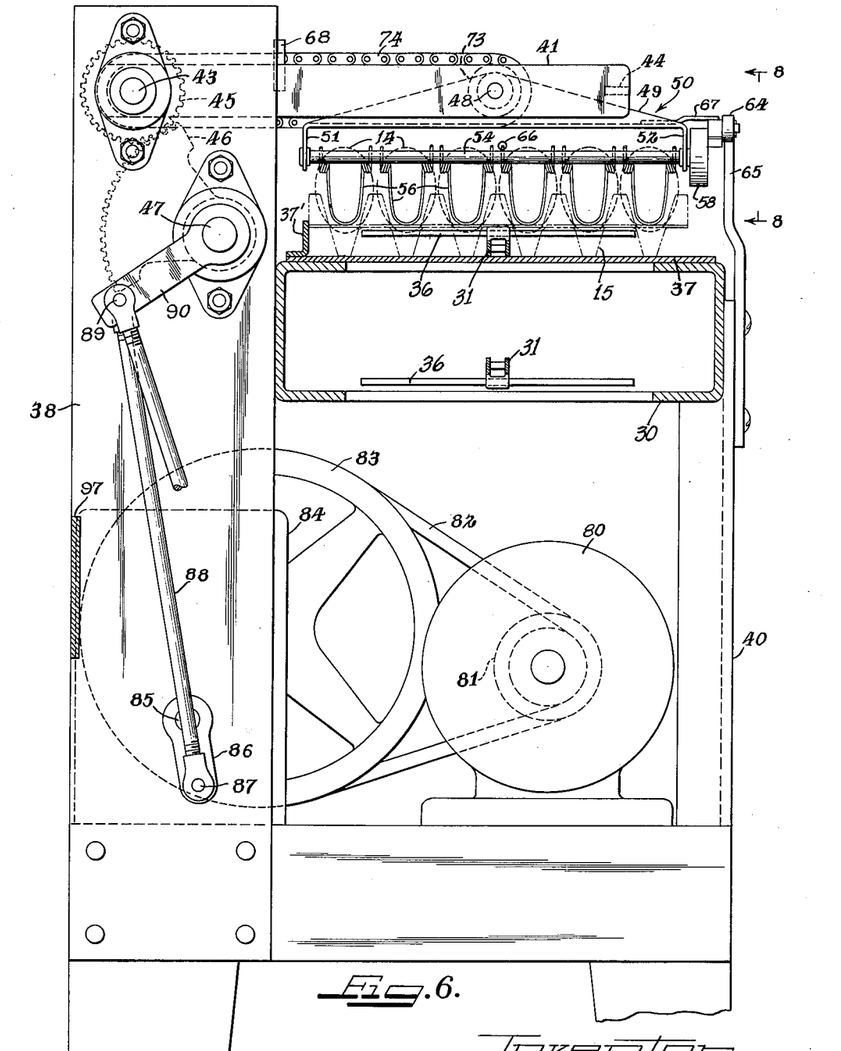
FIGURE 6 is a section taken on the line 6—6 of FIGURE 1, to an enlarged scale.

The rock shaft 47 and the conveyor assembly 10 are connected to a common drive mechanism. The rock shaft 47 is oscillated and the conveyor drive shaft 34 is rotated intermittently in timed relation through a linkage and ratchet mechanism which is operated by motor 80 mounted on the end supporting frame member 40 (FIGURES 1, 4, 6 and 7) at the infeed end of the washing machine. The motor 80 (FIGURE 6) has its drive pulley 81 connected by a belt 82 with a pulley 83 on a change speed device 84. The output shaft 85 of the change speed device carries a crank arm 86 which is pivotally connected at 87 to the bottom end of an upwardly directed link bar 88. The link bar 88 has its upper end pivoted at 89 to a crank arm 90 mounted on the rock shaft 47. Rotation of the crank arm 90, of course, oscillates the rock shaft 47.

The drive shaft 34 of the conveyor assembly 10 is extended beyond the side of the conveyor support frame 30 and carries a sprocket 91 and a ratchet member 92. The sprocket 91 is connected by the chain 93 with a sprocket 94 mounted on a shaft 95 which is journaled in laterally spaced bearing forming bracket plates 96 and 97, the former depending from the side of the conveyor frame 30 and the latter extending from the support plate 38. The lower shaft 95 carries a ratchet 98 wihch is straddled by a U-shaped member 99 pivotally mounted on the shaft 95 and carrying a spring pressed dog 100 for engaging with the two teeth 101 on the ratchet member 98. The dog carrying member 99 has the lower end of link 102 pivoted thereto at 102' with the upper end of the link 102 connected to the pivot 89 on the crank arm 90 so that reciprocation or oscillation of the crank arm 90 oscillates the dog carrying member 99. A link member 103 has its lower end connected to the pivot 102' on the member 99 and its upper end pivotally connected at 104 to another U-shaped dog carrying member 105 which is rotatably supported on the conveyor drive shaft 34. The member 105 has a spring pressed dog 106 which engages with the teeth 107 on the ratchet member 92. The ratchet 92 is provided with five of the teeth 107 for engagement by the dog 106, so that oscillation of the member 105 through the connecting linkage 102, 103 with the crank arm 90 and engagement of the dog 106 with each tooth 107 on the ratchet 92 turns the shaft 34 so as to move the tray advancing conveyor chain 31 a distance corresponding to the distance between the centers of adjoining rows of eggs on a tray 15 which is advanced by a cross bar 36. Rotation of the shaft 34 through the turning of the ratchet member 92 causes the lower shaft 95 to be rotated one-half the amount due to a two to one ratio of the sprockets 91 and 94. The ratchet member 99 on the lower shaft 95 is provided with two teeth 101 which are 180° apart and which are adapted to be engaged by the dog 100 on the oscillating member 99. The ratchet members 92 and 94 are arranged on the shafts 34 and 95 so that a tooth 101 on the ratchet member 94 is engaged by the dog 100 on the oscillating member 99 after the fifth tooth 107 on the ratchet member 92 has been engaged by the dog 106 and the conveyor chain 31 has been advanced to position the fifth row of eggs on a tray 15 for pick up by the transfer device 12. Engagement of the dog 100 with a tooth 101 causes the shaft 95 ot rotate and through the chain and sprocket connection the shaft 34 is also rotated overriding the ratchet member 92. This advances the conveyor chain 31 the necessary distance to bring the first row of eggs in a succeeding tray 15 into pick up position with the empty tray 15 ahead of the same being advanced to a stacking mechanism 110 at the end of the chain 31. It also rotates the ratchet 92 so as to position the first tooth 107 for engagement by the dog 106 upon the next swinging of the member 105.

The empty tray stacking mechanism 110 comprises a lifting plate or platform 111 mounted on a depending vertical rod or post 112 which is supported for vertical reciprocation in guide forming bearing members 113. The lift plate 111 also has a depending guide rod 114 mounted in parallel relation with the rod 112 which slides in a guideway forming member 115 to prevent turning of the lifting plate 111 about the axis of the support rod 112. The lift plate 111 is mounted to reciprocate between a pair of laterally spaced, upwardly extending stack supporting spring plates 116 and 116' which have their upper edges spaced apart a distance somewhat less than the width of a tray 15 so that when a tray 15 is depositer on the lift plate 111 by the conveyor chain 31 it may be lifted by the plate 111 into position on the bottom of the stack with the plates 116 and 116' springing apart sufficiently to permit the tray to move into position above the same, leaving the stack resting on the top edges of the plates 116 and 116' when the lift plate 111 is lowered. The lift plate 111 is reciprocated in a vertical direction in timed relation to the movement of the conveyor chain 31 by a pair of arm members 117 which are mounted on a cross shaft 118 pournaled in the side plates of the conveyor support frame 30 and carrying one one end an arm 119 which extends into the path of an arm 120 carried on the end of the conveyor drive shaft 34 so that when the shaft 34 is rotated to advance a tray 15 onto the lift plate 111 the arm 120 engages with the arm 119 causing rotation of the shaft 118 and raising the lift plate 111 so as to elevate the empty tray 15 into the bottom of the stack.

Figure 9:
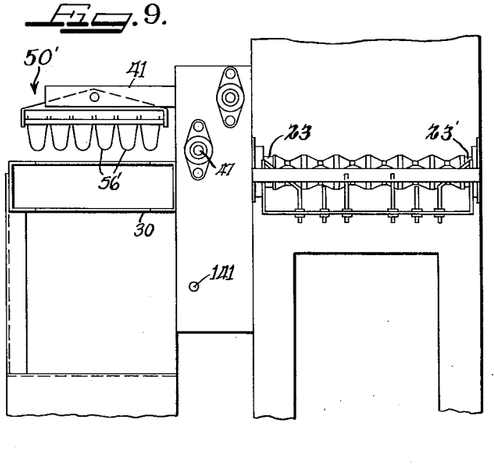
Figure 10:
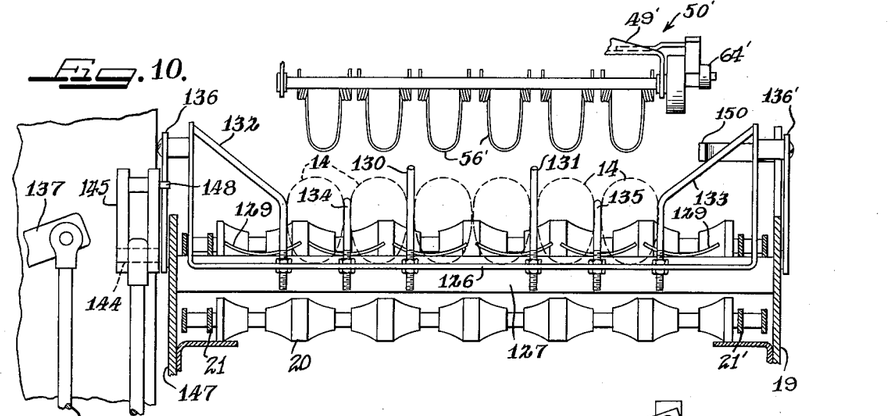
Figure 11:
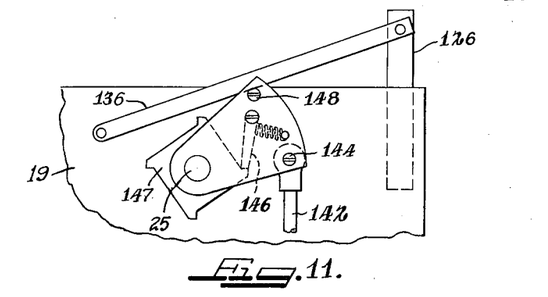

At the outfeed end 18 of the washing machine (FIGURES 1 and 9) the rows of eggs are removed from the conveyor 16 by a transfer device 17 which is of the same construction as the transfer device 12 at the infeed end of the machine. The outfeed transfer device 17 is operated to pick up successive rows of eggs from the outfeed end 18 of the washing machine conveyor 16 and transfer the same to empty pockets in an egg packing tray 15' which is carried on the tray supporting conveyor assembly 10. The empty trays 15' may be manually placed on the conveyor 10 by the operator or they may asscciated with the conveyor 10. Any suitable mechanism for unstacking and feeding empty trays for pick up by the cross bars 36 may be employed.

The outfeed transfer device 17 (FIGURES 1 and 9 to 11) comprises a supporting frame 41' which corresponds to the frame 41 of the transfer device 12 and a gripper assembly 50' which corresponds to the gripper assembly of the transfer device 12 but which is mounted with its ends reversed on the frame 41'. The frame 41' is mounted on a shaft 121 which is journaled in longitudinally spaced, vertical support plates 122 and 122' and carries a pinion 123 engaging with a toothed segment 124 on the rock shaft 47 which is also journaled in the support plates 122 and 122'. The support plates 122 and 122' are carried above and end frame support or base frame 125 for the conveyor assembly 10.

Each successive row of eggs is delivered at the outfeed end 18 of the washing conveyor 13 for pick up by the gripper members 55' and 56' on the transfer device 17 by means of a reciprocating U-shaped bar or frame 126 which reciprocates in a vertical path between a pair of spaced cross bar members 127 and 128 mounted at the end of the washing machine frame 19 on which each successive row of eggs is delivered from the pockets in the conveyor 16. The cross bar member 127 which is adjacent the end of the conveyor 16 is provided with spaced guide forming pad members 129 for supporting the eggs as they roll out of the pockets between the roller assemblies and onto the bars 127 and 128. The reciprocating egg positioning frame 126 is provided with an arrangement of upstanding wire-like rod members or pins which are spaced in symmetrical relation on opposite sides of the longitudinal center line of the conveyor and which are constructed and arranged to position the eggs uniformly with the larger ends up and properly spaced to be picked up by the gripper members 55' and 56'. The innermost orienting rods 130, 130' and 131, 131' are arranged in paired relation with the upper ends of each pair thereof bent slightly outwardly and with the pairs of rods equally spaced from the longitudinal center line of the conveyor 16. The rods of each pair thereof are spaced in the direction longitudinally of the machine. The outermost orienting rods 132, 132' and 133, 133' are arranged in pairs in a like manner and the pairs thereof are equally spaced from the longitudinal center line of the machine with their upper portions angled upwardly and outwardly so as to cause the end eggs in the row to turn on their small ends into the pockets formed between the outermost pairs of rods and the next adjacent single rods 134 and 135 which are equally spaced between the outermost and innermost pairs of rods. With the rods arranged as shown particularly in FIGURE 10, the eggs are picked up by upward movement of the frame member 126 so that they assume a position with their long axes vertical and with their centers spaced across the frame with the same spacing as the spacing of the gripper members 55', 56' on the gripper assembly 50'. The orienting frame 126 is pivotally connected at opposite ends to the ends of a pair of supporting arm members 136 and 136' which have their opposite ends pivoted to the side members of the washing machine frame 19. The egg orienting and lifting frame 126 is reciprocated between the bar members 127 and 128 in timed relation to the movement of the conveyor 16 and the transfer device 17 by mechanism connected to the rock shaft 47. A crank arm 137 is mounted on the rock shaft 47 and pivotally connected to the upper end of a vertically extending link 138 which is pivotally connected at its lower end at 139 to a short crank arm 140 which is supported on a pivot shaft 141 extending between the support plates 122 and 122'. A second vertically extending link 142 has its lower end pivotally connected at 143 to the crank arm 140 and its upper end pivoted at 144 to one corner of a triangular plate member 145 which is pivotally mounted on the end of the shaft 25 which drives the washing machine conveyor 16. The plate member 145 carries a spring pressed dog 146 which operates a ratchet plate 147 secured on the conveyor drive shaft 25 for advancing the washing machine conveyor 16 intermittently in timed relation to the oscillation of the drive shaft 47 and the swinging movement of the transfer device 17. The plate member 45 is also provided with a pin 148 on which the supporting arm member 136 for the orienting frame 126 rests so that reciprocation of the link 142 raises and lowers the orienting frame 126 in timed relation to the movement of the transfer device 17 and the washing machine conveyor 16. A cam forming member 150 mounted on the washing machine conveyor frame 19 is disposed in the path of the roller 64' for closing the gripper members 55' and 56' when the assembly 50' reaches the pick up position. A waste tray 151 extends outwardly of the outermost cross bar 128 at the end of conveyor 16.

Figure 1:
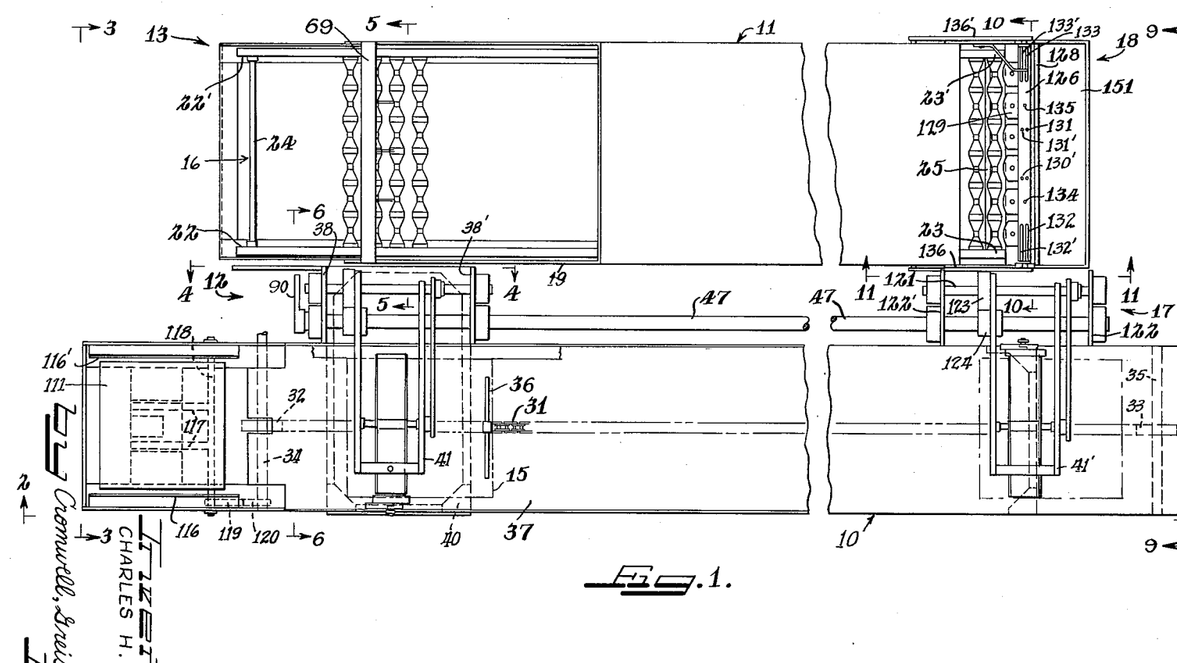
FIGURE 1 is a plan view of an egg handling apparatus arranged for delivering eggs to the infeed end of an egg washing machine and removing the clean eggs from the outfeed end of the washing machine, with parts of the washing machine being omitted and with portions of the handling apparatus being broken away.
Figure 3:
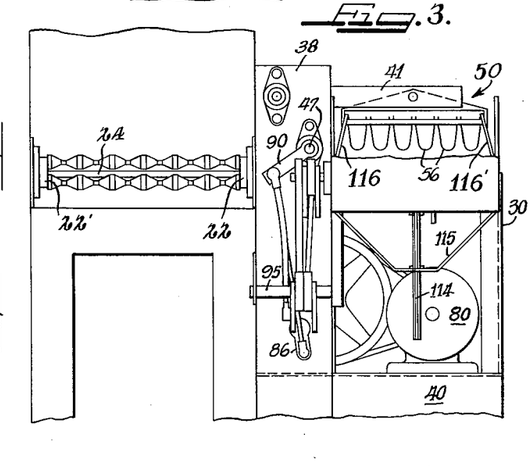
FIGURE 3 is an end elevation of the apparatus at the infeed end of the washing machine.
Figure 4:
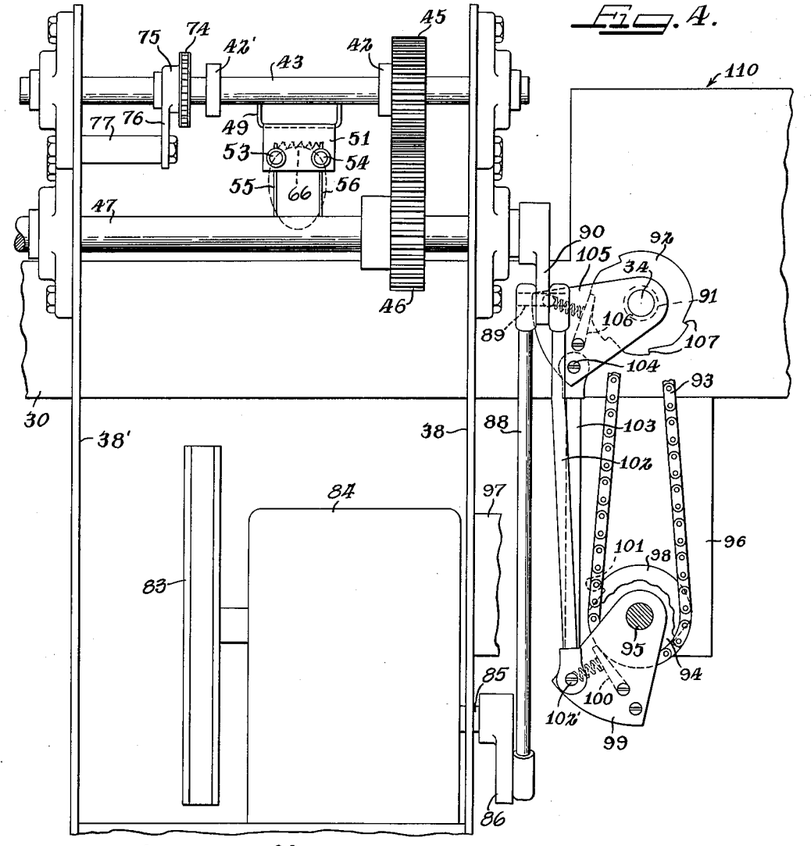
FIGURE 4 is a sectional view taken on the line 4—4 of FIGURE 1, to an enlarged scale.

In the operation of the apparatus the operator removes trays 15 filled with the eggs from a standard egg crate and places them on the conveyor assembly 10 in position for pick up by the cross bars 36 at the left hand end of the conveyor as shown in FIGURE 1. The conveyor is intermittently advanced by operation of the drive mechanism to advance successive rows of eggs into proper position for pick up by the infeed transfer device 12 which automatically picks up each row of the eggs and deposits the eggs in the pockets of the conveyor 16 on which the eggs are advanced through the washing machine 11 to the discharge end 18 thereof where each successive row of eggs is discharged onto the parallel bars 127 and 128. When a tray is emptied by operation of the transfer device 12 it is moved ahead of the transfer station and into the tray stacking mechanism. The orienting and lifting frame 126 is moved vertically in timed relation to the delivery of the eggs onto the supporting bar members and to the movement of the outfeed transfer device 17. The eggs are turned on end, with the larger end uppermost, by upward movement of the frame 126 and raised to the proper elevation for pick up by the gripper fingers 55' and 56' on the outfeed transfer device 17. Each successive row of eggs is picked up and moved by operation of the transfer device 17 to proper position for deposit in a row of empty pockets in a packing tray which has been positioned on the right hand end of the conveyor assembly 10 either by the attendant or by means of an automatic unstacking and feeding apparatus. When a tray at the right hand end of the machine is filled with clean eggs and is advancing towards the middle of the conveyor assembly 10, it is removed from the conveyor by the attendant and placed in a clean egg crate. Thus all that is required of the operator to keep the washing machine operating at full capacity is to supply filled egg trays at one end of the conveyor assembly 10, empty trays at the other end and remove the trays filled with clean eggs.

While specific details of construction and particular materials have been referred to in describing the apparatus illustrated in the drawings, it will be understood that other details of construction and equivalent materials may be resorted to within the spirit of the invention.

I claim:

1. The combination with a horizontally disposed endless egg transporting conveyor which is characterized by spaced rollers extending between side chains and having axially spaced peripheral grooves aligned longitudinally of the conveyor so as to form egg receiving pockets between successive rollers, an egg tray supporting conveyor also disposed horizontally and arranged in parallel relation along one side of said egg transporting conveyor, an egg transfer device mounted adjacent the egg receiving end of the egg transporting conveyor, said transfer device being pivoted to swing in a lateral path above said conveyors and having a laterally disposed egg gripper assembly pivoted thereon so as to swing between an egg pick up position above an egg tray on said tray supporting conveyor and an egg discharge position above said egg carrying conveyor, means to operate said egg transfer device so as to move successive rows of eggs from the tray supporting conveyor to the egg transporting conveyor, a second egg transfer device mounted adjacent the egg discharging end of said egg transporting conveyor, said second egg transfer device being pivoted to swing in a lateral path above said conveyors and having a laterally disposed egg gripper assembly pivoted thereon to swing between an egg pick up position above the egg discharge end of said egg transporting conveyor and an egg discharge position above an egg tray positioned on said tray supporting conveyor, and means to operate said second egg transfer device so as to move successive rows of eggs from said egg transporting conveyor to empty trays positioned on said tray supporting conveyor.

2. Apparatus for automatically supplying eggs in row formation to the infeed end of an egg conveyor in an egg washing machine and for removing the cleaned eggs from the outfeed end of the egg conveyor, the egg conveyor having transversely spaced pockets for supporting the eggs with their long axis horizontal, said apparatus comprising in combination with said egg conveyor a supply conveyor arranged in parallel relation to the egg conveyor for supporting trays on which eggs are arranged in rows with their long axes extending vertically, an infeed egg transfer device mounted for swinging movement in a lateral path at the infeed end of the egg conveyor and having means thereon for gripping a row of eggs on said tray carrying conveyor at one end of its swinging movement and for depositing the eggs on the egg conveyor at the other end of said movement, an outfeed egg transfer device mounted for lateral swinging movement at the outfeed end of the egg conveyor and having means thereon for gripping a row of eggs at the end of said egg conveyor at one end of its swinging movement and for releasing the eggs for deposit on a tray positioned on said tray carrying conveyor at the other end of its swinging movement, guide means at the infeed end of the egg conveyor for guiding the eggs from the closely spaced, vertically disposed relation in which they are released from the transfer device to the wider spaced pockets in the egg conveyor, and guide means at the outfeed end of the egg conveyor for arranging the eggs with their long axes disposed in vertical relation for pick up by said outfeed transfer device.

3. Apparatus for automatically feeding eggs in row formation to the infeed end of an egg transporting conveyor in an egg washing machine and for removing the cleaned eggs in row formation from the outfeed end of the egg transporting conveyor, the egg transporting conveyor being disposed horizontally and being characterized by spaced roller assemblies extending between traveling side supports and having circumferential grooves which are longitudinally aligned to form pockets between adjacent assemblies for supporting the eggs in horizontally disposed relation, said apparatus comprising the combination with said transporting conveyor of a supply conveyor arranged in parallel relation with said transporting conveyor along one side of the washing machine, an infeed egg transfer device mounted for reciprocating swinging movement at the infeed end of the transporting conveyor and having means thereon for gripping a row of eggs disposed in vertical relation in a packing tray placed on said supply conveyor at one end of its swinging movement and for releasing the eggs on the transporting conveyor at the other end of said swinging movement, guide forming means associated with said infeed egg transfer device and said transporting conveyor for guiding and orienting the eggs so that they move into the pockets of said transporting conveyor, an outfeed egg transfer device mounted for reciprocating swinging movement at the outfeed end of the transporting conveyor and having means thereon for gripping a row of eggs delivered from said transporting conveyor in row formation at one end of the swinging movement and for releasing the eggs for deposit in an empty tray placed on the supply conveyor at the other end of the swinging movement, and means associated with said outfeed transfer device and transporting conveyor for delivering the eggs from the transporting conveyor to the transfer device in vertical position.

4. In combination with an egg transporting conveyor which is characterized by spaced roller assemblies extending between traveling side support members with the roller assemblies having circumferential grooves aligned in a longitudinal direction of the conveyor so as to provide pockets between successive roller assemblies for receiving rows of eggs with their long axis generally horizontal, apparatus for automatically feeding eggs in row formation to the infeed end of said transporting conveyor and removing the eggs in row formation from the longitudinally spaced outfeed end of said transporting conveyor, said apparatus comprising a tray supporting conveyor arranged in parallel relation to the transporting conveyor adjacent one side of said transporting conveyor, an egg transfer device mounted for reciprocating swinging movement at the infeed end of the transporting conveyor and having gripping means thereon for picking up a row of eggs disposed in closely spaced relation with their long axis vertical from a tray on said tray supporting conveyor at one end of its swinging movement and for releasing the eggs onto the transporting conveyor at the other end of said movement, means for guiding and separating the eggs when they are released on the transporting conveyor so that they move into the pockets thereof with their long axis horizontal, a second egg transfer device mounted for reciprocating swinging movement at the outfeed end of the transporting conveyor and having gripping means thereon for picking up a row of eggs from said transporting conveyor at one end of its swing movement and for releasing the eggs for deposit on an empty tray on said tray supporting conveyor at the other end of the swinging movement, and means at the outfeed end of the transporting conveyor for guiding the eggs into closely spaced relation with their long axis vertical for pick up by said second transfer device.

5. Apparatus for automatically supplying eggs in row formation to the infeed end of an egg conveyor in an egg washing machine and for removing the cleaned eggs from the outfeed end of the egg conveyor, said egg conveyor having transversely spaced pockets for supporting the eggs with their long axis horizontal, said apparatus comprising in combination with said egg conveyor a supply conveyor arranged in parallel relation to the egg conveyor for supporting trays on which the eggs are arranged in rows with their long axes extending vertically, an infeed egg transfer device mounted for swinging movement in a lateral path at the infeed end of the egg conveyor and means thereon for gripping a row of eggs on said tray carrying conveyor at one end of its swinging movement and for depositing the eggs onto the egg conveyor at the other end of said movement, an outfeed egg transfer device mounted for lateral swinging movement at the outfeed end of the egg conveyor and having means thereon for gripping a row of eggs at the end of said egg conveyor at one end of its swinging movement and for releasing the eggs for deposit in a tray positioned on said tray carrying conveyor at the other end of its swinging movement.

References Cited by the Examiner

UNITED STATES PATENTS

| | | | |
|---|---|---|---|
| 1,110,256 | 9/1914 | Dalgeleish | 214—301 |
| 1,373,604 | 4/1921 | Dyer | 214—301 |
| 1,852,309 | 4/1932 | Kennedy | 88—14.2 |
| 1,987,336 | 1/1935 | Powell | 214—309 X |
| 2,431,265 | 11/1947 | Madsen et al. | 214—309 X |
| 2,442,827 | 6/1948 | Schmidt | 214—309 |
| 2,553,373 | 5/1951 | Hyatt | 214—309 |
| 2,627,990 | 2/1953 | Page | 214—300 |
| 2,895,587 | 7/1959 | Willsey | 198—27 |
| 2,978,854 | 4/1961 | Fairest | 53—246 |
| 2,979,746 | 4/1961 | Willsey | 15—3.13 |
| 3,060,660 | 10/1962 | Reading | 53—246 |

FOREIGN PATENTS

| | | |
|---|---|---|
| 221,901 | 6/1959 | Australia. |
| 802,816 | 10/1958 | Great Britain. |

GERALD M. FORLENZA, *Primary Examiner.*

UNITED STATES PATENT OFFICE
CERTIFICATE OF CORRECTION

Patent No. 3,231,118  January 25, 1966

Charles H. Willsey

It is hereby certified that error appears in the above numbered patent requiring correction and that the said Letters Patent should read as corrected below.

Column 2, lines 40 and 41, for "vertically" read -- vertical --; line 52, before "wherein" insert -- drawings --; column 6, line 16, for "ot" read -- to --; line 33, for "lifting" read -- lift --; line 39, for "depositer" read -- deposited --; line 48, for "pournaled" read -- journaled --; line 50, for "one one end" read -- on one end --; line 67, after "may" insert -- be automatically fed from a magazine (not shown) --; line 68, for "asscciated" read -- associated --; column 7, line 7, for "and end" read -- an end --;

Signed and sealed this 6th day of December 1966.

(SEAL)
Attest:

ERNEST W. SWIDER
Attesting Officer

EDWARD J. BRENNER
Commissioner of Patents